(12) United States Patent
Lemm et al.

(10) Patent No.: US 6,319,973 B1
(45) Date of Patent: Nov. 20, 2001

(54) SOLVENT-FREE APPLICABLE HEAT-CURING COATING MATERIAL

(75) Inventors: Markus Lemm, Blaustein; Kai Lemke; Dieter Grafl, both of Ulm, all of (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/358,810

(22) Filed: Jul. 22, 1999

(51) Int. Cl.$^7$ .................................................. C08J 3/10
(52) U.S. Cl. ..................... 524/404; 524/495; 524/506; 524/508; 524/509; 524/520; 524/522
(58) Field of Search .................... 524/404, 495, 524/506, 508, 509, 520, 522

(56) References Cited

U.S. PATENT DOCUMENTS

| | | | |
|---|---|---|---|
| 4,055,503 | * 10/1977 | Anselment et al. ................... | 252/12 |
| 4,469,714 | * 9/1984 | Wada et al. ......................... | 427/54.1 |
| 4,672,003 | * 6/1987 | Letoffe ............................... | 428/447 |
| 4,849,295 | * 7/1989 | Dickerman et al. ................. | 428/457 |
| 5,110,861 | * 5/1992 | Togami et al. ...................... | 524/601 |
| 5,530,050 | * 6/1996 | Rangaswamy ...................... | 524/430 |
| 6,096,413 | * 8/2000 | Kalinoski et al. ................... | 428/220 |

FOREIGN PATENT DOCUMENTS

| | | | |
|---|---|---|---|
| 3802090 A1 | 8/1989 | (DE) | ............................ C09K/3/10 |
| 3905922 A1 | 8/1990 | (DE) | ............................ F16J/15/12 |
| 361115929 | * 11/1984 | (JP) . | |

OTHER PUBLICATIONS

Abstract of DE 3802090, Derwent WPI, Apr. 28, 2000.
Abstract of DE 3905922, Derwent WPI, Feb. 4, 2000.

* cited by examiner

Primary Examiner—Edward J. Cain
Assistant Examiner—Wyrozebski-Lee Kat
(74) Attorney, Agent, or Firm—Rader, Fishman & Grauer PLLC

(57) ABSTRACT

Solvent-free applicable curable coating material containing as binder inorganic polymers and/or organic polymers, cross-linkers and sliding aids.

13 Claims, No Drawings

SOLVENT-FREE APPLICABLE HEAT-CURING COATING MATERIAL

The invention relates to a solvent-free applicable curable coating material containing a sliding agent aid in addition to the coating material itself. The invention also relates to the use of a coating material of this type for coatings of metal seals and the seals themselves.

The properties of the coating material and its processability play an important part particularly for coating surfaces of metal seals.

Flat seals, in particular cylinder head gaskets or exhaust seals of internal combustion engines are namely increasingly designed as a single-layer or multi-layer metal seal and thus consist conventionally of up to four individual layers. One or more layers preferably consisting of steel are crimped, folded or edged to seal off the media. The sealing surfaces of flat seal materials of this type are furthermore provided with part or whole-area coatings of polymer materials on one or both sides to improve their sealing quality. Basically elastomers, thermoplastics or thermosets which still deform when installed and pressed tightly and thus lie well against the corresponding sealing surfaces and seal, are thus used as polymeric materials. Examples of such polymer materials are fluorine, rubber, polyimide synthetic resin and acrylonitrile-butadiene.

It is also known from German 3 905 922 to additionally add solid sliding aids to a polymer coating of this type to reduce sliding friction. A mixture of fine grain to pulverulent polytetrafluoroethylene and fine grain to pulverulent molybdenum sulphite is thus proposed as solid sliding aid.

An elastomer coating for metal seals is likewise described in German Patentschrift 3 80 290, wherein here pulverulent mineral fillers, for example silicon dioxide, silicates or kaolins, are proposed to reduce sliding friction.

The disadvantage of all these coating materials is that here they are essentially materials which are applied as wet chemicals and in which more or less toxic solvents are used. It is also necessary to adhere to expensive process steps when applying these layers.

Starting from here, the object of the present invention is to propose a novel coating materials, which may also be applied by means of modern current techniques simply and without problems to the surface of substrates, in particular metal layers of a cylinder head gasket or exhaust seals. However, the coating material must thus at the same time also be designed so that it reduces sliding friction and has micro-sealing effect.

The object is achieved with regard to the coating material by the characterising features of patent claim 1, regarding the use by the features of claim 10, and with regard to the seal by the features of claim 14.

The sub-claims show advantageous developments.

It is thus proposed according to the invention to use a solvent-free applicable coating material which thus ensures that no damaging vapours are produced and thus no problems occur when applying the coating material to the metal layers. It should be emphasised in particular that at the same time sliding aids are also introduced together with the coating material of the invention, so that surface coating is then achieved with solvent-free application by one coating step, and at the same time the sliding friction is also reduced.

The coating material of the invention thus contains a solvent-free, liquid or pulverulent meltable polymer which may be processed with or without cross-linker, wherein sliding aids are incorporated into the above-mentioned polymer. The coating material preferably thus contains 50–85 wt. % of binder, 0–50 wt. % of cross-linker and 5–40 wt. % of sliding aids.

It is particularly preferable if pulverulent polymers, that is powder lacquers, are used for the coating material of the invention. Such powder lacquers conventionally consist of binder and cross-linker. For the coating material of the invention it is particularly preferable if the binder is an inorganic polymer, such as polysiloxane, siloxane resin or polyphosphazene, or an organic polymer, such as phenolic resin, epoxy resin, polyimide or unsaturated polyester or PVC. Of course, it is also possible that the polymers may be used as a mixture of the above-mentioned groups. All cross-linkers known hitherto from the state of the art may be used as cross-linkers for binders of this type. An overview of this can be seen, for example from Stoye/Freitag, Lackharze [Lacquer resins], Verlag Hauser 1996.

In the coating material of the invention it is particularly important that layer thicknesses of the final layer are realised which lie between 5 and 100 $\mu$m. To realise such layer thicknesses it is necessary that powder having a powder size between 7 and 80 $\mu$m, preferably 40–60 $\mu$m, be used. Preferred pulverulent compositions, with which such layer thicknesses can be realised, are based on epoxy resins, silicone resins, polyester resins or mixtures. The epoxy resins are cross-linked, for example using polycarboxylic acid or polyphenols, polyester resins using multifunctional glycidyl compounds or blocked isocyanates. Silicone resins cross-link using tin catalyst or purely thermally.

Sliding aids which are suitable for the coating material of the invention are preferably boron nitride, graphite, molybdenum disulphite, PTFE, metal powder or mixtures thereof.

In addition to the possibilities described above for formulating the coating material from pulverulent starting components, it is also possible to use solvent-free liquid polymers instead of pulverulent starting materials. For favourable coating materials, the viscosity should lie between 50 to 200,000 MPas. Examples of such solvent-free liquid-processable polymers are;

Epoxy resin/multifunctional amine cross-linkers for cold-cross-linking or polydimethylsiloxane with blocked SiOH groups and tin catalyst.

The sliding aids described above may be incorporated in these solvent-free, processable liquid polymers in the same proportions.

The applications process for the coating materials described depends on whether pulverulent or liquid polymers are used. Basically all application processes known from the state of the art, such as powder spraying, fluidised-bed coating, liquid polymer rolling, casting, screen printing or immersion, are possible.

Heat cross-linking polymers are cured in a furnace in a subsequent process. It may be advantageous to only melt the powder in the furnace and to cross-link the polymer layer only in the component in the installed state or at least re-cross-link. Better conformation to the surface roughnesses of the components may thus be achieved. Liquid solvent-free polymers are cross-linked to a solid state and re-cross-linked in the component.

The considerable advantage of the coating material of the invention now lies in being able to carry out surface coatings here, for example on metal layers of metal seals, by means of the most modern technology via EDP-assisted programmes. This also opens the possibility of producing not only whole-area coatings, but coating part regions according to selected lay-out via discrete control of the application process. No odour-related pollutants whatever are produced due to the fact that the procedure is solvent-free and the layer has at the same time lubricating properties. Clear advantages are achieved compared to the state of the art, particularly for metal seals, as regards the economy of the process and environmental pollution due to this novel coating process.

The coating material of the invention can accordingly also be applied particularly preferably for producing coatings on metal seals at a layer thickness of 20 to 80 μ for metal seals.

The coating material may also be used for applying a layer for a multi-layer system. Hence, such a layer may serve as the basis for further coatings.

Finally, the invention also relates to the metallic seals coated with the coating material described above, such as flat seals, in particular cylinder head gaskets. Seals for very different applications can be produced due to the fact that the coating material may be applied using the widest variety of techniques. The coating material may thus be applied over the whole area or partially.

The invention is described in more detail below using selected formulation examples.

EXAMPLE 1

Solvent-free liquid polymer: for example 798 g of a liquid solvent-free polydimethylsiloxane having methoxy protective groups, 54 g of tetraethoxysilane, 30 g of a tin catalyst, 100 g of boron nitride, 10 g of an amino-functional silane and 8 g of an anti-foaming agent.

EXAMPLE 2

Pulverulent polymer: 510 g of a silicone resin, softening point>45° C., 130 g of boron nitride, 30 g of molybdenum sulphide, 5 g of benzoin, 5 g of a flow-control agent.

Application processes: powder: powder spraying, fluidised-bed coating, liquid polymer rolling, casting, screen printing, immersion.

What is claimed is:

1. A multi-layer gasket for sealing an internal combustion engine, the gasket comprising:
    a metal layer having first and second surfaces and at least one opening extending from the first surface to the second surface of the metal layer; and
    a polymeric layer at least partially covering the first surface of the metal layer, the polymeric layer comprising a pulverulent mixture applied on the metal layer in the absence of a solvent, the pulverulent mixture comprising a polymer binder, a cross-linker for curing the polymer binder, and a sliding aid.

2. The multi-layer gasket of claim 1, wherein the pulverulent mixture comprises fifty to eighty-five weight percent polymer binder, up to fifty weight percent cross-linker, and five to forty weight percent sliding aid.

3. The multi-layer gasket of claim 1, wherein the polymer binder is a polysiloxane, a siloxane resin, a polyphosphazene, or combinations thereof.

4. The multi-layer gasket of claim 1, wherein the polymer binder is a polysiloxane.

5. The multi-layer gasket of claim 1, wherein the polymer binder is a phenolic resin, an epoxy resin, a polyimide, an unsaturated polyester, a polyvinyl chloride, or combinations thereof.

6. The multi-layer gasket of claim 1, wherein the polymer binder is an epoxy resin.

7. The multi-layer gasket of claim 1, wherein the sliding aid is boron nitride, graphite, molybdenum disulphide, polytetrafluoroethylene, metal powder, or combinations thereof.

8. The multi-layer gasket of claim 1, wherein the sliding aid is boron nitride.

9. The multi-layer gasket of claim 1, wherein the pulverulent mixture has a powder size of about seven μm to about eighty μm.

10. A coating material as recited in claim 1, wherein the polymeric layer has a thickness of about five μm to about one hundred μm.

11. A method of making a multi-layer gasket comprising:
    providing a metal layer having first and second surfaces and at least one opening extending from the first surface to the second surface of the metal layer;
    depositing a pulverulent mixture on the first surface of the metal layer, the pulverulent mixture comprising a polymer binder, a cross-linker for curing the polymer binder, and a sliding aid;
    heating the pulverulent mixture so as to form a polymeric layer that at least partially covers the first surface of the metal layer; and
    curing the polymer binder.

12. A method of making a multi-layer gasket comprising:
    providing a metal layer having first and second surfaces and at least one opening extending from the first surface to the second surface of the metal layer;
    depositing a mixture on the first surface of the metal layer in the absence of a solvent so as to form a polymeric layer at least partially covering the first surface of the metal layer, the mixture comprising a liquid polymer binder, a cross-linker for curing the liquid polymer binder, and a sliding aid; and
    curing the liquid polymer binder by heating.

13. The multi-layer gasket made in accordance with the process of claim 12.

* * * * *